(12) United States Patent
Kang

(10) Patent No.: US 10,118,374 B2
(45) Date of Patent: Nov. 6, 2018

(54) DEVICE AND METHOD FOR MANUFACTURING MEMBRANE-ELECTRODE ASSEMBLY OF FUEL CELL

(71) Applicant: HYUNDAI MOTOR COMPANY, Seoul (KR)

(72) Inventor: Byoung Yook Kang, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 113 days.

(21) Appl. No.: 15/266,312

(22) Filed: Sep. 15, 2016

(65) Prior Publication Data
US 2017/0259552 A1 Sep. 14, 2017

(30) Foreign Application Priority Data

Mar. 8, 2016 (KR) .................. 10-2016-0027666

(51) Int. Cl.
| | |
|---|---|
| B32B 39/00 | (2006.01) |
| B32B 41/00 | (2006.01) |
| B05C 5/02 | (2006.01) |
| B32B 7/00 | (2006.01) |

(Continued)

(52) U.S. Cl.
CPC .......... B32B 39/00 (2013.01); B05C 5/0245 (2013.01); B05C 5/0254 (2013.01); B32B 37/0053 (2013.01); B32B 41/00 (2013.01); H01M 8/1004 (2013.01); B32B 2307/202 (2013.01);

(Continued)

(58) Field of Classification Search
USPC ....... 156/247, 289, 701, 714, 719, 537, 538, 156/750, 767
See application file for complete search history.

(56) References Cited

U.S. PATENT DOCUMENTS

| | | | |
|---|---|---|---|
| 7,910,175 B2* | 3/2011 | Webber ................. | C25D 5/02 |
| | | | 359/296 |
| 8,092,657 B2* | 1/2012 | De Bosscher ...... | H01J 37/3435 |
| | | | 204/192.1 |

(Continued)

FOREIGN PATENT DOCUMENTS

| | | | | |
|---|---|---|---|---|
| EP | 1209252 A2 * | 5/2002 | ......... | C23C 16/4412 |
| JP | 2010-145796 A | 7/2010 | | |

(Continued)

*Primary Examiner* — Sing P Chan
(74) *Attorney, Agent, or Firm* — McDermott Will & Emery LLP

(57) ABSTRACT

A device for manufacturing a membrane-electrode assembly of a fuel cell includes: an electrolyte membrane feeder unwinding an electrolyte membrane and supplying the unwound electrolyte membrane to a preset transfer path; a first catalyst coater installed in the side of the electrolyte membrane feeder and coating a first catalytic material on another surface of the electrolyte membrane every a preset pitch; a film processor installed in a rear side of the first catalyst coater, supplying a second protective film onto a first catalyst electrode layer on the other surface of the electrolyte membrane, and taking off the first protective film from the one surface of the electrolyte membrane; and a second catalyst coater installed in a rear side of the film processor and coating a second catalytic material on the one surface of the electrolyte membrane.

20 Claims, 4 Drawing Sheets

(51) Int. Cl.
  *H01M 8/1004* (2016.01)
  *B32B 37/00* (2006.01)
(52) U.S. Cl.
  CPC ....... *B32B 2309/72* (2013.01); *B32B 2457/18* (2013.01); *Y02P 70/56* (2015.11)

(56) References Cited

U.S. PATENT DOCUMENTS

| | | | | |
|---|---|---|---|---|
| 8,179,587 | B2* | 5/2012 | Weber | G02F 1/1523 359/269 |
| 8,182,958 | B2* | 5/2012 | Okanishi | H01M 8/0273 429/480 |
| 8,524,003 | B2* | 9/2013 | Carcia | B65H 18/00 118/500 |
| 8,529,700 | B2* | 9/2013 | Carcia | B65H 18/00 118/500 |
| 8,534,591 | B2* | 9/2013 | Kinard | B65H 18/103 242/536 |
| 8,551,249 | B2* | 10/2013 | Carcia | B65H 18/00 118/500 |
| 8,728,950 | B2* | 5/2014 | Kawabe | B05D 5/06 118/410 |
| 8,753,712 | B2* | 6/2014 | Dudley | H01L 21/02096 427/154 |
| 9,368,749 | B2* | 6/2016 | Boesch | H01L 51/5256 |
| 9,444,049 | B2* | 9/2016 | Headrick | H01L 51/0003 |
| 9,486,828 | B2* | 11/2016 | Miura | B05C 9/04 |
| 9,505,028 | B2* | 11/2016 | Steiner | B05D 5/06 |
| 9,507,068 | B2* | 11/2016 | Hatanaka | G02B 5/305 |
| 9,711,263 | B2* | 7/2017 | Pellerite | H01B 1/22 |
| 9,884,437 | B2* | 2/2018 | Johnson | B29C 39/22 |
| 2008/0023332 | A1* | 1/2008 | Webber | C25D 5/02 204/510 |
| 2008/0264785 | A1* | 10/2008 | De Bosscher | H01J 37/3405 204/298.15 |
| 2011/0048327 | A1* | 3/2011 | Carcia | B65H 18/00 118/728 |
| 2011/0048328 | A1* | 3/2011 | Carcia | B65H 18/00 118/728 |
| 2011/0048639 | A1* | 3/2011 | Estrada | B65H 18/00 156/324 |
| 2011/0048991 | A1* | 3/2011 | Carcia | B65H 18/00 206/387.1 |
| 2011/0049285 | A1* | 3/2011 | Kinard | B65H 18/103 242/416 |
| 2011/0123866 | A1* | 5/2011 | Pan | H01M 2/16 429/221 |
| 2011/0250401 | A1* | 10/2011 | Dudley | H01L 21/02096 428/161 |
| 2012/0032157 | A1* | 2/2012 | Kawabe | B05D 1/265 257/40 |
| 2013/0011608 | A1* | 1/2013 | Wolk | B29C 67/202 428/141 |
| 2013/0309452 | A1* | 11/2013 | Minoura | B32B 33/00 428/141 |
| 2014/0042095 | A1* | 2/2014 | Unnikrishnan | B01D 67/0062 210/650 |
| 2014/0093652 | A1* | 4/2014 | Yan | C23C 14/568 427/532 |
| 2014/0183135 | A9* | 7/2014 | Unnikrishnan | B01D 67/0062 210/650 |
| 2014/0230846 | A1* | 8/2014 | Dudley | H01L 21/02096 134/4 |
| 2014/0272254 | A1* | 9/2014 | Boesch | H01L 51/5256 428/72 |
| 2014/0318452 | A1* | 10/2014 | Stowell, Jr. | B05D 3/0486 118/708 |
| 2015/0007769 | A1* | 1/2015 | Miura | B05C 9/04 118/708 |
| 2015/0076106 | A1* | 3/2015 | Pellerite | H01B 1/22 216/13 |
| 2015/0140316 | A1* | 5/2015 | Steiner | B05D 5/06 428/316.6 |
| 2015/0194605 | A1* | 7/2015 | Headrick | H01L 51/0003 257/40 |
| 2015/0226895 | A1* | 8/2015 | Hatanaka | G02B 5/305 359/487.02 |
| 2015/0306547 | A1* | 10/2015 | Unnikrishnan | B01D 67/0034 96/12 |
| 2016/0238929 | A1* | 8/2016 | Schmidt | G03F 7/028 |
| 2016/0368019 | A1* | 12/2016 | Wolk | B29C 67/202 |
| 2017/0012264 | A1* | 1/2017 | Carlson | H01M 2/166 |
| 2017/0031226 | A1* | 2/2017 | Gauthier | B32B 37/02 |
| 2017/0098857 | A1* | 4/2017 | Carlson | H01M 10/058 |
| 2017/0239929 | A1* | 8/2017 | Cobb | B32B 37/14 |
| 2017/0338045 | A1* | 11/2017 | Vak | H01G 9/0029 |
| 2017/0368569 | A9* | 12/2017 | Wolk | B29C 67/202 |
| 2018/0015644 | A1* | 1/2018 | Johnson | B29C 39/36 |
| 2018/0044852 | A1* | 2/2018 | Downs | D06P 5/004 |

FOREIGN PATENT DOCUMENTS

| | | |
|---|---|---|
| JP | 2011-508952 A | 3/2011 |
| KR | 2008-0071391 A | 8/2008 |
| KR | 10-2015-0059806 A | 6/2015 |

* cited by examiner

DEVICE AND METHOD FOR MANUFACTURING MEMBRANE-ELECTRODE ASSEMBLY OF FUEL CELL

CROSS-REFERENCE TO RELATED APPLICATION

This application claims the benefit of priority to Korean Patent Application No. 10-2016-0027666 filed in the Korean Intellectual Property Office on Mar. 8, 2016, the entire content of which is incorporated herein by reference.

TECHNICAL FIELD

The present disclosure relates to a system for manufacturing a fuel cell stack component, and more particularly, to a device and a method for manufacturing a membrane-electrode assembly (MEA) of a fuel cell.

BACKGROUND

As known, a fuel cell produces electricity through an electrochemical reaction between hydrogen and oxygen. The fuel cell may continuously produce electrical energy upon receiving a chemical reactant from outside without having a separate charging process.

The fuel cell may include separators (or bipolar plates) which are disposed on both sides of a membrane-electrode assembly (MEA) therebetween. A plurality of fuel cells may be arranged to form a fuel cell stack.

Here, the membrane-electrode assembly that is an example of a core component of the fuel cell as a three-layer structure, includes an electrolytic membrane in which hydrogen ions transfer, an anode catalyst electrode layer formed on one surface of the electrolytic membrane, and a cathode catalyst electrode layer formed on the other surface of the electrolytic membrane. A direct coating method and a decal method are examples of a method of manufacturing the three-layer structure membrane-electrode assembly.

In a roll-to-roll process for unwinding an electrolyte membrane wound in a roll form and forming a catalyst electrode layer on both surfaces of the electrolyte membrane, a method for directly coating a catalyst slurry on the electrolyte membrane cannot be employed because of a low (or poor) property of the electrolyte membrane.

Thus, the catalyst electrode layer cannot be directly coated on the electrolyte membrane in a roll-to-roll process according to a related art so that the decal method for transferring the catalyst electrode layer on the electrolyte membrane is used after the catalyst electrode layer is coated on a separate release film.

In the decal method, an release film of a roll type coated with each catalyst electrode layer and an electrolyte membrane of a roll type pass a bonding roll of high temperature and high pressure to be laminated (thermally compressed), and the release film is removed so that the membrane-electrode assembly of the three-layer structure is manufactured.

However, in the decal method using the roll lamination process, in a state in which the release film coated with each catalyst electrode layer on both sides via the electrolyte membrane interposed therebetween is positioned, since they pass between the bonding rolls of high temperature and high pressure and the catalyst electrode layer and the electrolyte membrane are laminated in the directions such that they contact each other, it is difficult to align the lamination positions of the anode catalyst electrode layer and the cathode catalyst electrode layer.

In other words, the release film and the electrolyte membrane continuously pass between the bonding rolls of high temperature and high pressure that are always pressed and the catalyst electrode layer is laminated on both surfaces of the electrolyte membrane, and in this roll laminating continuous process, it is difficult to correctly accord the lamination positions of the catalyst electrode layers by a feeding speed difference of the release film.

Another reason that the lamination positions of the anode catalyst electrode layer and the cathode catalyst electrode layer are difficult to align is because a pitch between the catalyst electrode layers is not constant in the process of manufacturing the catalyst electrode layer of the continuous patterns by coating the catalyst slurry to the release film.

Thus, when the membrane-electrode assembly (MEA) is manufactured by the decal method according to a related art, a failure rate is very high and production rate of the MEA is low so that productivity is reduced.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a device and a method for manufacturing a membrane-electrode assembly (MEA) of a fuel cell which is capable of compensating for inferior property of an electrolyte membrane in a roll-to-roll process and of directly coating a catalyst electrode layer on the electrolyte membrane.

According to an exemplary embodiment in the present disclosure, a device for manufacturing the membrane-electrode assembly (MEA) of the fuel cell includes an electrolyte membrane feeder which unwinds an electrolyte membrane that includes one surface attached to by a first protective film and is wound in a roll form and which supplies the unwound electrolyte membrane to a preset transfer path; a first catalyst coater which is installed in the side of the electrolyte membrane feeder and coats a first catalytic material on the other surface of the electrolyte membrane every a preset pitch; a film processing unit which is installed in the rear side of the first catalyst coater, supplies a second protective film onto a first catalyst electrode layer on the other surface of the electrolyte membrane, and takes off the first protective film from one surface of the electrolyte membrane; and a second catalyst coater which is installed in the rear side of the film processing unit and coats a second catalytic material on one surface of the electrolyte membrane every a preset pitch.

The electrolyte membrane may be transferred along the transfer path by a roll-to-roll method.

The device for manufacturing the membrane-electrode assembly (MEA) of the fuel cell may further include: a first drying furnace which is installed in the middle of the transfer path between the first catalyst coater and the film processing unit and dries the first catalyst electrode layer.

The device for manufacturing the membrane-electrode assembly (MEA) of the fuel cell may further include: a second drying furnace which is installed in the middle of the transfer path in the rear side of the second catalyst coater and dries the first catalyst electrode layer on the other surface of the electrolyte membrane and the second catalyst electrode layer on one surface of the electrolyte membrane.

The device for manufacturing the membrane-electrode assembly (MEA) of the fuel cell may further include an MEA rewinder which is installed in the rear side of the second drying furnace and winds an MEA roll sheet in which the first catalyst electrode layer on the second protective film and the second catalyst electrode layer are formed on both surfaces of the electrolyte membrane.

The device for manufacturing the membrane-electrode assembly (MEA) of the fuel cell may further include a position sensor which is installed in the front side of the second catalyst coater, senses position of the first catalyst electrode layer, and outputs the sensed signal to a controller.

The controller may determine coating position of the second catalyst coater according to the sensed signal of the position sensor.

The film processing unit may include: a film rewinder which is installed in one side of the transfer path and takes off the first protective film from one surface of the electrolyte membrane to wind the electrolyte membrane in a roll form; and a film unwinder which corresponds to the film rewinder, is installed in the other side of the transfer path, and unwinds the second protective film to supply the second protective film onto the first catalyst electrode layer on the other surface of the electrolyte membrane.

The film processing unit may form the film rewinder and the film unwinder in a single cartridge body.

The film rewinder may include: a rewinding roller which winds the first protective film in a roll form; and a first guide roller which guides the first protective film peeled from one surface of the electrolyte membrane to the rewinding roller.

The film unwinder may include: an unwinding roller which unwinds the second protective film wound in a roll form; and a second guide roller which guides the second protective film onto the first catalyst electrode layer on the other surface of the electrolyte membrane.

The first catalyst coater and the second catalyst coater may include a slot die which includes a long slot nozzle that is formed along a width direction of the electrolyte membrane.

A first support roller which supports one surface of the electrolyte membrane may be installed in the side of the first catalyst coater.

A second support roller which supports the other surface of the electrolyte membrane may be installed in the side of the second catalyst coater.

According to another exemplary embodiment in the present disclosure, a method for manufacturing a membrane-electrode assembly (MEA) of the fuel cell includes unwinding, by an electrolyte membrane feeder, an electrolyte membrane that includes one surface attached to by a first protective film and is wound in a roll form and suppling, by the electrolyte membrane feeder, the unwound electrolyte membrane to a preset transfer path; coating, by a first catalyst coater, a first catalytic material on the other surface of the electrolyte membrane every a preset pitch; supplying, by a film processing unit, a second protective film onto a first catalyst electrode layer on the other surface of the electrolyte membrane and taking off, by the film processing unit, the first protective film from one surface of the electrolyte membrane; and coating, by a second catalyst coater, a second catalytic material on one surface of the electrolyte membrane every a preset pitch.

In a process in which the electrolyte membrane is transferred along the transfer path by a roll-to-roll process, the first catalytic material may be coated on the other surface of the electrolyte membrane by the first catalyst coater in a state in which the first protective film is attached to one surface of the electrolyte membrane.

In a process in which the electrolyte membrane is transferred along the transfer path by a roll-to-roll process, the second catalytic material may be coated on one surface of the electrolyte membrane by the second catalyst coater in a state in which the second protective film is attached to the other surface of the electrolyte membrane.

A first drying furnace may pass the electrolyte membrane and may dry the first catalyst electrode layer on the other surface of the electrolyte membrane.

Position of the first catalyst electrode layer on the other surface of the electrolyte membrane may be sensed by a position sensor and the sensed signal may be outputted to a controller.

Coating position of the second catalyst coater may be adjusted according to the sensed signal of the position sensor by the controller.

A second drying furnace may pass the electrolyte membrane and may dry the first catalyst electrode layer on the other surface of the electrolyte membrane and a second catalyst electrode layer on one surface of the electrolyte membrane.

The second drying furnace may pass an MEA roll sheet in which the first catalyst electrode layer on the second protective film and the second catalyst electrode layer are formed on both surfaces of the electrolyte membrane.

The MEA roll sheet may be wound in a roll form by an MEA rewinder.

According to the exemplary embodiments, property of the electrolyte membrane may be well maintained and a catalytic material may be directly coated on both surfaces of the electrolyte membrane by using process of the first protective film and the second protective film in the roll-to-roll process.

Therefore, unlike the decal method for transferring the catalyst electrode layer on the electrolyte membrane according to the related art, the catalytic material may be formed on both surfaces of the electrolyte membrane by using a direct coating method in the roll-to-roll process. Accordingly, good quality of the membrane-electrode assembly (MEA) may be ensured, a process time for manufacturing the MEA may be shortened, and productivity of the MEA may be improved.

Further, according to the embodiments, a process and equipment for transferring the catalyst electrode layer on the electrolyte membrane according to the related art may be removed, and thus, may reduce investment costs for facilities and operator maintenance costs. In addition, a low-cost protective film may be used instead of an expensive release film, thereby reducing material cost according to production of the MEA.

BRIEF DESCRIPTION OF THE DRAWINGS

While the drawings are described in connection with what is presently considered to be practical exemplary embodiments, it is to be understood that the invention is not limited to the disclosed drawings.

DETAILED DESCRIPTION OF THE EMBODIMENTS

Figure 1:
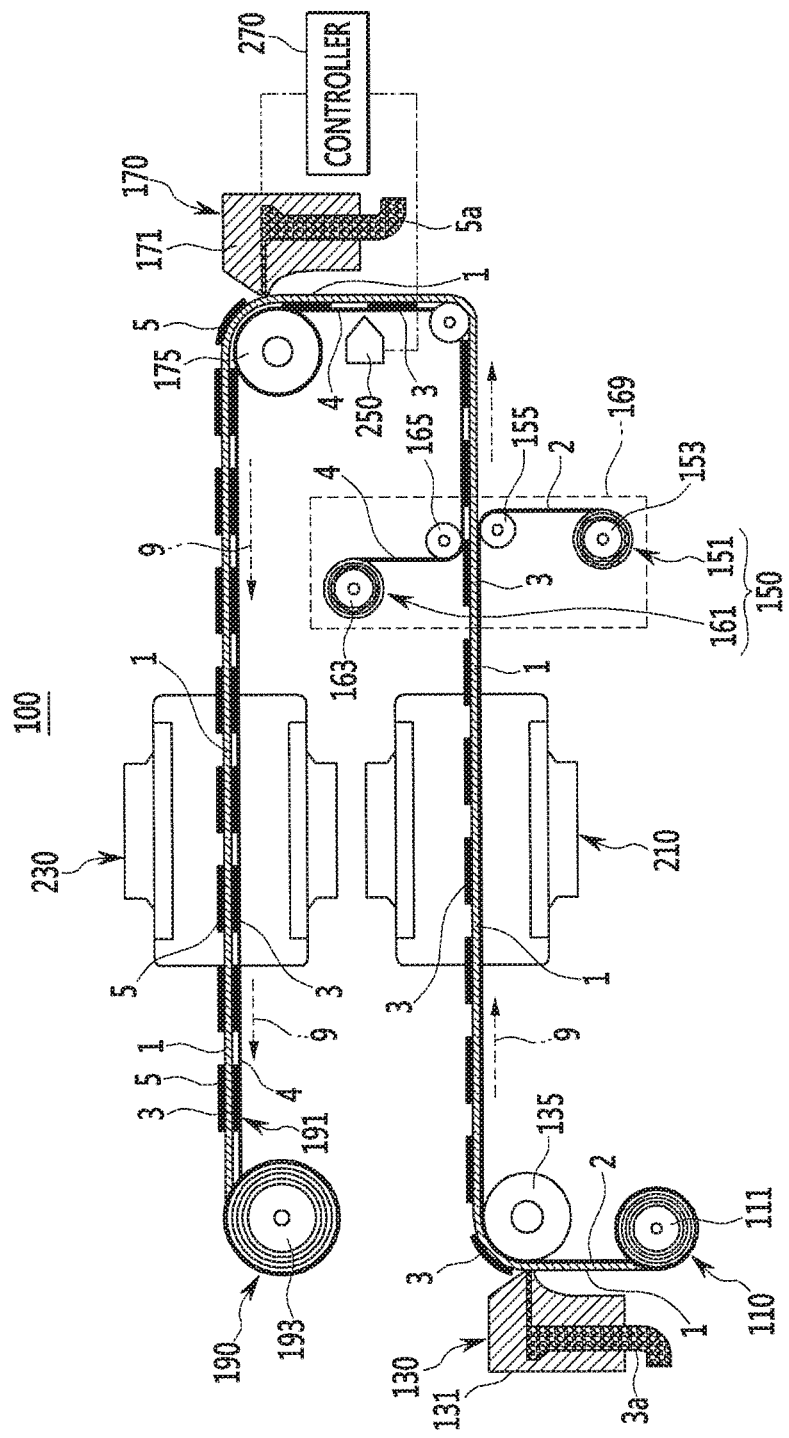
FIG. 1 is a simplified view showing a device for manufacturing a membrane-electrode assembly (MEA) of a fuel cell according to an exemplary embodiment in the present disclosure.

The present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure.

Portions having no relation with the description will be omitted in order to explicitly explain the present disclosure, and the same reference numerals will be used for the same or similar elements throughout the specification.

In the drawings, size and thickness of each element is approximately shown for better understanding and ease of description. Therefore, the present invention is not limited to the drawings, and the thicknesses of layers, films, panels, regions, etc., are exaggerated for clarity.

Further, in the following detailed description, names of constituents, which are in the same relationship, are divided into "the first", "the second", and the like, but the present disclosure is not limited to the order in the following description.

In the specification, unless explicitly described to the contrary, the word "comprise" and variations such as "comprises" or "comprising," will be understood to imply the inclusion of stated elements but not the exclusion of any other elements.

In addition, the terminology such as " . . . unit," " . . . means," " . . . part", or " . . . member," which is disclosed in the specification, refers to a unit of an inclusive constituent which performs at least one of the functions or operations.

FIG. 1 is a simplified view showing a device for manufacturing a membrane-electrode assembly (MEA) of a fuel cell according to an exemplary embodiment in the present disclosure.

Referring to FIG. 1, a device 100 for manufacturing an MEA of a fuel cell according to the present disclosure may be applied to an automated system for automatically and continuously manufacturing a component of a unit cell included in a fuel cell stack.

In the automated system, the device 100 may manufacture the MEA by using a roll-to-roll method. The MEA may include catalyst electrode layers 3 and 5 formed on both surfaces of an electrolyte membrane 1.

Here, the roll-to-roll method may mean a method in which the electrolyte membrane 1 wound in a roll form is unwound to be transferred along a preset transfer path 9 by transfer rollers and the catalyst electrode layers 3 and 5 are formed on both surfaces of the electrolyte membrane 1. The preset transfer path 9 is indicated by a dotted line arrow in FIG. 1.

The device 100 may manufacture a roll sheet in which the catalyst electrode layers 3 and 5 are formed on both surfaces of the electrolyte membrane 1 and may include a process that winds the roll sheet in a roll form.

The automated system may unwind the roll sheet wound in a roll form to cut the unwound roll sheet in a unit form, and may manufacture a membrane-electrode assembly having a three-layer structure in which the catalyst electrode layers 3 and 5 are formed on both surfaces of the electrolyte membrane 1.

The device 100 may compensate for inferior property of the electrolyte membrane 1 in a roll-to-roll process and may form the catalyst electrode layers 3 and 5 on both surfaces of the electrolyte membrane 1 by using a direct coating method.

The device 100 may include an electrolyte membrane feeder 110, a first catalyst coater 130, a film processing unit 150, a second catalyst coater 170, and an MEA rewinder 190.

These constituent elements are configured in a main frame of the automated system, and in this case, the main frame that is built in the upper and lower directions and supports each of the constituent elements may be configured by one frame or two or more partitioned frames.

The main frame may include various sub-elements to support the constituent elements of the device 100 such as a bracket, a bar, a rod, a plate, a housing, a case, a block, and the like.

However, since the various sub-elements are to install the constituent elements of the device 100, which will be described, to the main frame, the various sub-elements are generally referred to as the main frame in the present disclosure.

The electrolyte membrane feeder 110 may unwind the electrolyte membrane 1 that is wound in a roll form and may supply the unwound electrolyte membrane to a predetermined transfer path 9.

Here, the electrolyte membrane 1, which is in a state of a roll sheet, is wound in a roll form and a first protective film 2 may be attached to one surface of the electrolyte membrane 1. The cost of the first protective film 2 may be about 1/10 the cost of a release film and may support the one surface of the electrolyte membrane 1.

The electrolyte membrane feeder 110 may be rotatably installed in the main frame at a starting position of the transfer path 9 and may include a feed roller 111 that unwinds the electrolyte membrane 1 wound in a roll form and supplies the unwound electrolyte membrane to the transfer path 9.

The first catalyst coater 130 may directly coat (or apply) a catalyst slurry (or a first catalytic material) on another surface of the electrolyte membrane 1 on which is attached to the first protective film 2.

In other words, the first catalyst coater 130 may coat a first catalytic material 3a on the other surface of the electrolyte membrane 1 every a preset pitch, and a first catalyst electrode layer 3 that are spaced apart the pitch may be formed on the other surface of the electrolyte membrane 1. The first catalytic material 3a may be an anode catalytic material constituting an anode catalyst electrode layer of the MEA.

Figure 2:
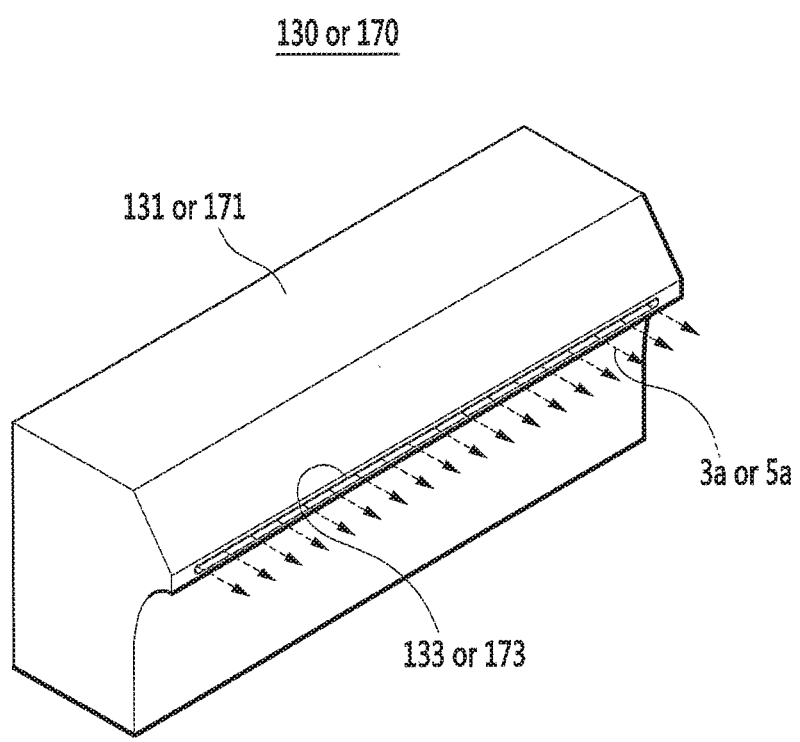
FIG. 2 is a simplified view showing a first catalyst coater and a second catalyst coater applied to the device for manufacturing the MEA of the fuel cell according to an exemplary embodiment in the present disclosure.

The first catalyst coater 130 may be installed in a rear side of the electrolyte membrane feeder 110. As shown in FIG. 2, the first catalyst coater 130 may include a first slot die 131 that sprays the first catalytic material 3a on the other surface of the electrolyte membrane 1 every the predetermined pitch. The pitch may be pitch spacing. The first slot die 131 may coat the first catalytic material 3a on the other surface of the electrolyte membrane 1 through a long slot nozzle 133 that is a first slot nozzle and is formed along a width direction of the electrolyte membrane 1.

Here, in a process in which the electrolyte membrane 1 is transferred from the electrolyte membrane feeder 110 along the transfer path 9 by the roll-to-roll process, the first slot die 131 may directly coat the first catalytic material 3a on the other surface of the electrolyte membrane 1 through the first slot nozzle 133 in a state in which the first protective film 2 is attached to one surface of the electrolyte membrane 1.

The first slot die 131 may coat the first catalytic material 3a on the other surface of the electrolyte membrane 1 in a state in which the one surface of the electrolyte membrane 1 that the first protective film 2 is attached to is supported by a first support roller 135.

The first support roller 135 may be rotatably installed in the main frame at the side of the first slot die 131, may support the one surface of the electrolyte membrane 1 that the first protective film 2 is attached to, and may perform a function of a transfer roller that transfers the electrolyte membrane 1 along the transfer path 9.

The present disclosure may include a first drying furnace 210 that dries the first catalyst electrode layer 3 of the first catalytic material 3a coated on the other surface of the electrolyte membrane 1 by the first catalyst coater 130.

The first drying furnace 210 may be installed in the rear of the first catalyst coater 130 and may be installed in the middle of the transfer path 9 between the first catalyst coater 130 and the film processing unit 150.

For example, the first drying furnace 210 may include a drying chamber that passes the electrolyte membrane 1 along the transfer path 9, may jet hot air or room temperature wind to the first catalyst electrode layer 3 on the other surface of the electrolyte membrane 1 in the drying chamber, and may dry the first catalyst electrode layer 3.

The film processing unit 150 may supply a second protective film 4 onto the first catalyst electrode layer 3 on the other surface of the electrolyte membrane 1, and may take off the first protective film 2 from the one surface of the electrolyte membrane 1.

In other words, in a state in which the first catalyst electrode layer 3 is formed on the other surface of the electrolyte membrane 1, the film processing unit 150 may attach the second protective film 4 on the first catalyst electrode layer 3 and may peel the first protective film 2 attached to the one surface of the electrolyte membrane 1.

The film processing unit 150 may be installed in a rear side of the film processing unit 150 that is disposed in a rear side of the first drying furnace 210, and may be installed in both sides of the transfer path 9. The film processing unit 150 may include a film rewinder 151 and a film unwinder 161.

The film rewinder 151 may take off the first protective film 2 from the one surface of the electrolyte membrane 1 to wind the electrolyte membrane in a roll form and may be installed in one side (or in the lower side) of the transfer path 9 that is disposed in the rear side of the first drying furnace 210.

The film rewinder 151 may include a rewinding roller 153 that winds the first protective film 2, which is peeled from the one surface of the electrolyte membrane 1, in a roll form and a first guide roller 155 that guides the first protective film 2 peeled from the one surface of the electrolyte membrane 1 to the rewinding roller 153.

The film unwinder 161, which corresponds to the film rewinder 151, may unwind the second protective film 4 to supply the second protective film 4 onto the first catalyst electrode layer 3 formed on the other surface of the electrolyte membrane 1 and may be installed in the other side (or in the upper side) of the transfer path 9.

The film unwinder 161 may include an unwinding roller 163 that unwinds the second protective film 4 wound in a roll form and a second guide roller 165 that guides the second protective film 4 onto the first catalyst electrode layer 3 on the other surface of the electrolyte membrane 1.

Here, the rewinding roller 153 and the unwinding roller 163 may rotate in the same direction, and the first guide roller 155 and the second guide roller 165 that are disposed at both sides of the electrolyte membrane 1 may rotate in the opposite direction.

The film rewinder 151 and the film unwinder 161 included in the film processing unit 150 may be formed in a single cartridge body 169, and the cartridge body 169 may be detachably installed in the main frame.

The second catalyst coater 170 may directly coat a catalyst slurry (or a second catalytic material) on the one surface of the electrolyte membrane 1 from which the first protective film 2 is peeled off by the film rewinder 151 of the film processing unit 150.

In other words, the second catalyst coater 170 may coat the second catalytic material 5a on the one surface of the electrolyte membrane 1 every a preset pitch, and second catalyst electrode layers 5 that are spaced apart the pitch may be formed on the one surface of the electrolyte membrane 1. The second catalytic material 5a may be a cathode catalytic material constituting a cathode catalyst electrode layer of the MEA.

The second catalyst coater 170 may coat the second catalytic material 5a on a preset area of the one surface of the electrolyte membrane 1. The predetermined area may correspond to the first catalyst electrode layer 3 formed on the other surface of the electrolyte membrane 1.

The second catalyst coater 170 may be installed in the rear side of the film processing unit 150. As shown in FIG. 2, the second catalyst coater 170 may include a second slot die 171 that sprays the second catalytic material 5a on the one surface of the electrolyte membrane 1 every the predetermined pitch in order to correspond to the first catalyst electrode layer 3 on the other surface of the electrolyte membrane 1. The pitch may be pitch spacing. The second slot die 171 may coat the second catalytic material 5a on the one surface of the electrolyte membrane 1 through a long slot nozzle 173 that is a second slot nozzle and is formed along a width direction of the electrolyte membrane 1.

Here, in a process in which the electrolyte membrane 1 is transferred along the transfer path 9 by the roll-to-roll process, the second slot die 171 may directly coat the second catalytic material 5a on the other surface of the electrolyte membrane 1 through the second slot nozzle 173 in a state in which the second protective film 4 is attached to the first catalyst electrode layer 3 on the other surface of the electrolyte membrane 1 by the film unwinder 161 of the film processing unit 150.

The second slot die 171 may coat the second catalytic material 5a on the one surface of the electrolyte membrane 1 in a state in which the other surface of the electrolyte membrane 1 that the second protective film 4 is attached to is supported by a second support roller 175.

The second support roller 175 may be rotatably installed in the main frame at the side of the second slot die 171, may support the other surface of the electrolyte membrane 1 that the second protective film 4 is attached to, and may perform a function of a transfer roller that transfers the electrolyte membrane 1 along the transfer path 9.

The device according to the present disclosure may include a second drying furnace 230 that dries the first catalyst electrode layer 3 on the other surface of the electrolyte membrane 1 and the second catalyst electrode layer 5 of the second catalytic material 5a coated on the one surface of the electrolyte membrane 1.

The second drying furnace 230 may be installed in the rear of the second catalyst coater 170 and may be installed in the middle of the transfer path 9 between the second catalyst coater 170 and the MEA rewinder 190.

For example, the second drying furnace 230 may include a drying chamber that passes the electrolyte membrane 1 along the transfer path 9, may jet hot air or room temperature wind to the first catalyst electrode layer 3 and the second catalyst electrode layer 5 on both surfaces of the electrolyte membrane 1 in the drying chamber, and may dry the first catalyst electrode layer 3 and the second catalyst electrode layer 5.

The MEA rewinder 190 may wind an MEA roll sheet 191 in a roll form. In the MEA roll sheet, the first catalyst electrode layer 3 formed on the second protective film 4 and the second catalyst electrode layer 5 may be formed on both surfaces of the electrolyte membrane 1.

In other words, the MEA rewinder 190 may wind the MEA roll sheet 191, which passes the second drying furnace 230, in a roll form.

The MEA rewinder 190 may be rotatably installed in the main frame at the rear side of the second drying furnace 230 and may include a winding roller 193 that winds the MEA roll sheet 191 in a roll form.

The device according to the present disclosure may include a position sensor 250 in order to accurately coat the second catalytic material 5a on the preset area of the one surface of the electrolyte membrane 1 by the second catalyst coater 170.

The position sensor 250 may be installed in the front side of the second catalyst coater 170. The position sensor 250 may sense (or detect) position of the first catalyst electrode layer 3 formed on the other surface of the electrolyte membrane 1, and may output the sensed signal to a controller 270.

The position sensor 250 may sense position of the first catalyst electrode layer 3 by using an electromagnetic wave including an ultrasonic wave, a laser beam, or an infrared ray or by taking a photograph (e.g., vision-photographing).

Because the position sensor 250 may be a known sensor that detects position of an object by using an electromagnetic wave or by taking a photograph, a more detailed description of the sensor 250 will be omitted in this specification.

The controller 270, which controls an overall operation of the device 100, may control operation of the second catalytic coater 170 based on the sensed signal received from the position sensor 250, and may determine coating position of the second catalyst coater 170 on the one surface of the electrolyte membrane 1.

Hereinafter, operation of the device 100 and a method for manufacturing the MEA of the fuel cell according to operation of the device 100 will be described with reference to FIG. 3 and FIG. 4.

Figure 3:
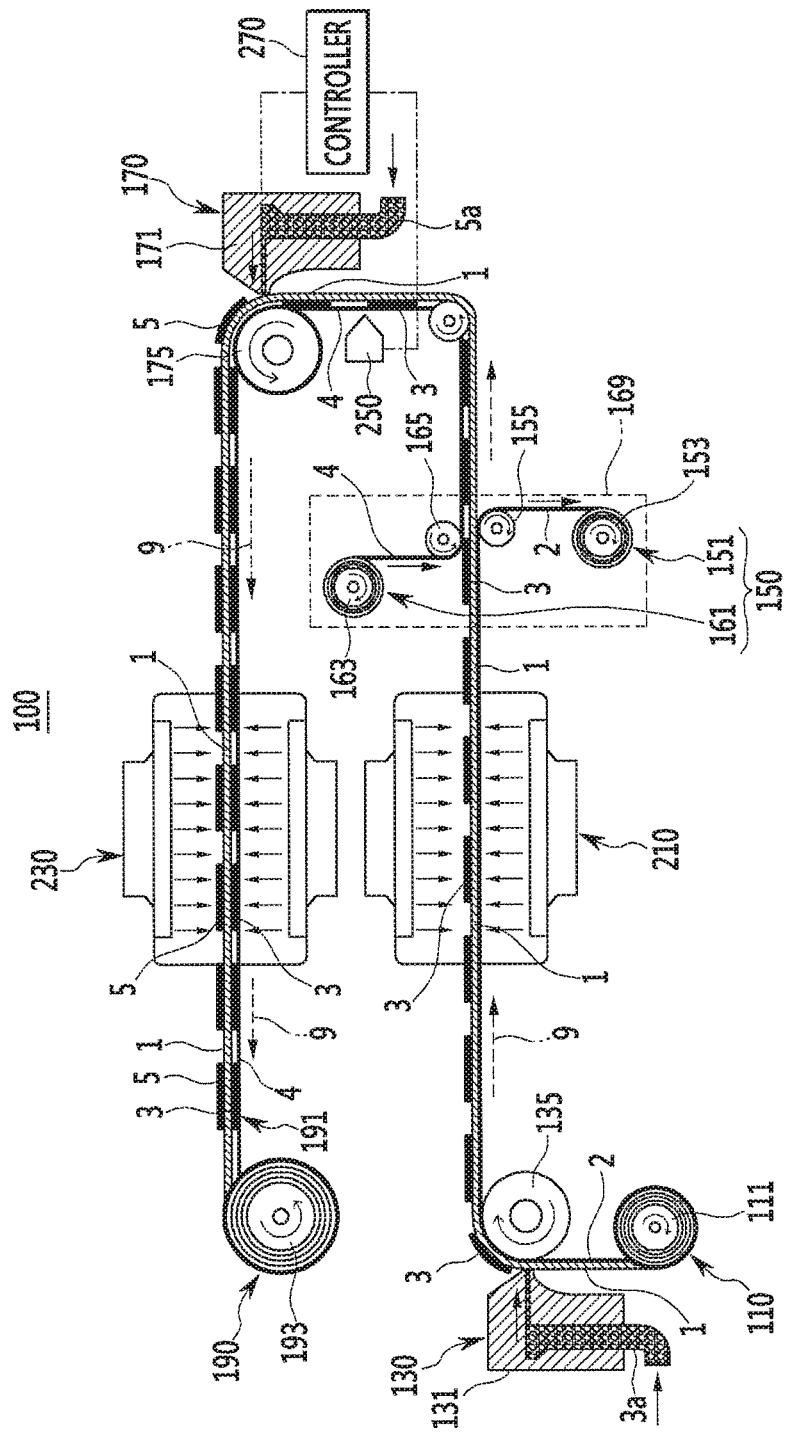
FIG. 3 is a view for explaining operation of the device for manufacturing the MEA of the fuel cell according to an exemplary embodiment in the present disclosure.
Figure 4:
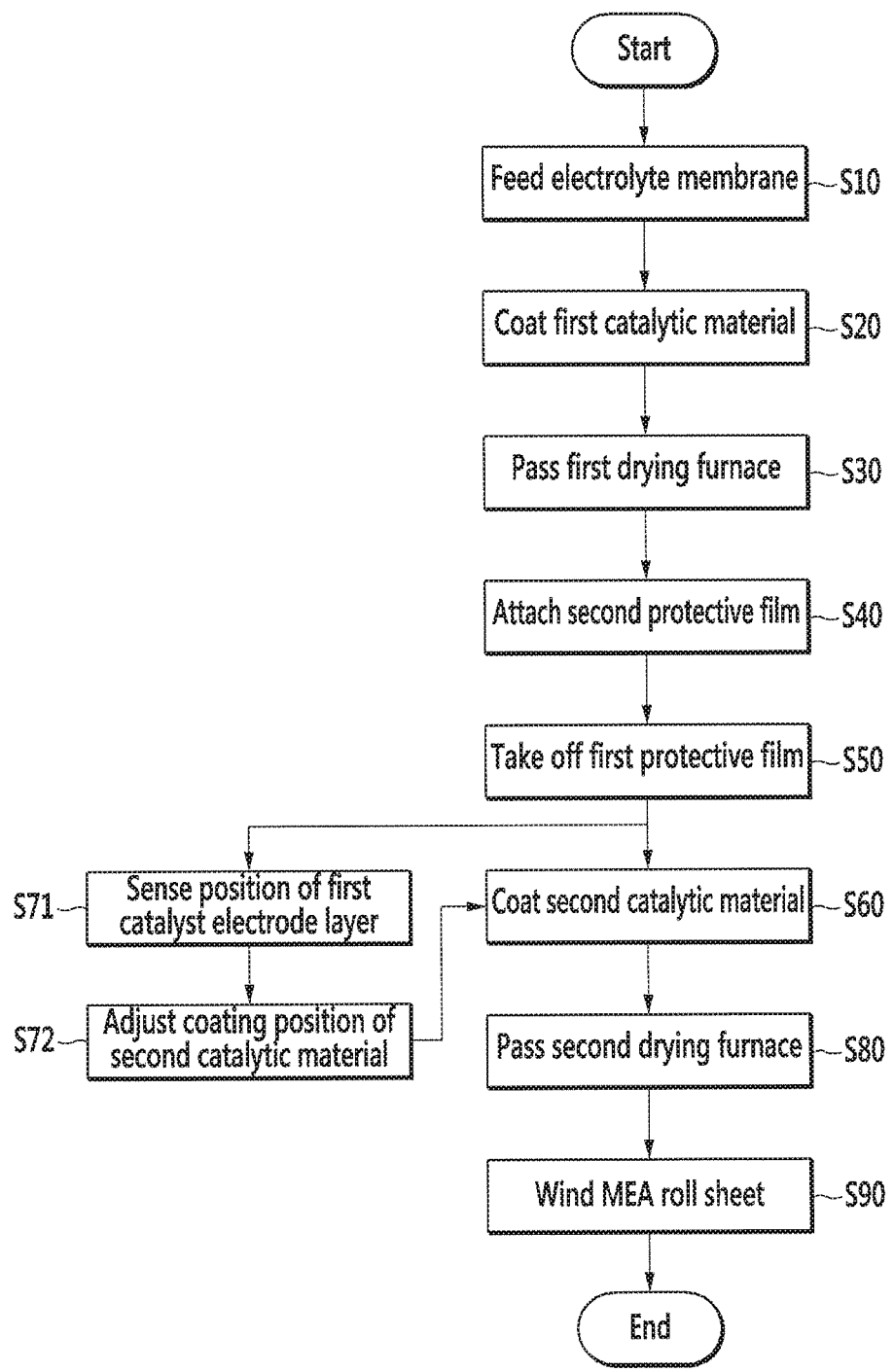
FIG. 4 is a flowchart describing a method for manufacturing the MEA of the fuel cell according to an exemplary embodiment in the present disclosure.

FIG. 3 is a view for explaining operation of the device for manufacturing the MEA of the fuel cell according to an exemplary embodiment in the present disclosure, and FIG. 4 is a flowchart describing a method for manufacturing the MEA of the fuel cell according to an exemplary embodiment in the present disclosure.

Referring to FIGS. 3 and 4, the present disclosure may unwind the electrolyte membrane 1 wound in a roll form by using the feed roller 111 of the electrolyte membrane feeder 110 and may feed (or provide) the unwound electrolyte membrane to the transfer path 9 used for the roll-to-roll process in step S10. Here, the first protective film 2 may be attached to the one surface of the electrolyte membrane 1.

In this state, the operation according to the present disclosure may directly coat the first catalytic material 3a on the other surface of the electrolyte membrane 1 every the predetermined pitch by using the first catalyst coater 130 (step S20).

Here, in a process in which the electrolyte membrane 1 is transferred from the electrolyte membrane feeder 110 along the transfer path 9 by the roll-to-roll process (or the roll-to-roll method), the first catalyst the coater 130 may directly coat the first catalytic material 3a on the other surface of the electrolyte membrane 1 in a state in which the first protective film 2 is attached to the one surface of the electrolyte membrane 1.

In other words, the first catalyst the coater 130 may coat the first catalytic material 3a on the other surface of the electrolyte membrane 1 in a state in which the one surface of the electrolyte membrane 1 that the first protective film 2 is attached to is supported by a first support roller 135.

Then, the operation according to the present disclosure may transfer the electrolyte membrane 1, which has the other surface coated by the first catalyst electrode layer 3 of the first catalytic material 3a, through the first drying furnace 210 to dry the first catalyst electrode layer 3 (step S30).

Next, the operation according to the present disclosure may attach the second protective film 4 to the first catalyst electrode layer 3 on the other surface of the electrolyte membrane 1 by using the film unwinder 161 (step S40).

Then, the first protective film 2 attached to the one surface of the electrolyte membrane 1 may be taken off by using the film rewinder 151 of the film processing unit 150 (step S50).

Because the first protective film 2 attached to the one surface of the electrolyte membrane 1 may be taken off after the second protective film 4 is attached to the first catalyst electrode layer 3 on the other surface of the electrolyte membrane 1, property of the electrolyte membrane 1 may be excellently maintained when the first protective film 2 is taken off.

Then, the second catalytic material 5a may be directly coated on the predetermined area of one surface (i.e, a surface from which the first protective film is peeled) of the electrolyte membrane 1 in a state in which the second protective film 4 is attached to the first catalyst electrode layer 3 on the other surface of the electrolyte membrane 1 by using the second catalyst coater 170 (step S60). The predetermined area may correspond to the first catalyst electrode layer 3.

The second catalyst coater 170 may coat the second catalytic material 5a on the one surface of the electrolyte membrane 1 in a state in which the other surface of the electrolyte membrane 1 that the second protective film 4 is attached to is supported by the second support roller 175.

At the front side of the second catalyst coater 170, a position of the first catalyst electrode layer 3 formed on the other surface of the electrolyte membrane 1 may be detected by using the position sensor 250, and may output the sensed signal to the controller 270 (step S71).

Then, the controller 270 may control operation of the second catalytic coater 170 based on the sensed signal received from the position sensor 250, and may adjust coating position of the second catalyst coater 170 on the one surface of the electrolyte membrane 1 (step S72).

In more detail, the controller 270 may the sensed signal from the position sensor 250 to obtain location information of the first catalyst electrode layer 3 and may adjust coating position of the second catalyst coater 170 according to the location information.

In other words, the controller 270 may control coating start time, coating time, and coating stop time (or coating end time) of the second catalyst coater 170 based on the location information of the first catalyst electrode layer 3.

Next, the operation according to the present disclosure may transfer the electrolyte membrane 1, which has one surface coated by the second catalyst electrode layer 5 of the second catalytic material 5a, through the second drying furnace 230 to dry the first catalyst electrode layer 3 on the other surface of the electrolyte membrane 1 and the second catalyst electrode layer 5 on the one surface of the electrolyte membrane 1 (step S80).

In this case, the MEA roll sheet 191, which includes the first catalyst electrode layer 3 formed on the second protective film 4 and the second catalyst electrode layer 5 which are formed on both surfaces of the electrolyte membrane 1, may be transferred through the second drying furnace 230 to dry the first and the second catalyst electrode layers 3 and 5.

Finally, the MEA roll sheet 191, which passes the second drying furnace 230, may be wound in a roll form by using the winding roller 193 of the MEA rewinder 190 (step S90).

The device 100 and the method for manufacturing the MEA of the fuel cell using the device 100 may directly coat catalytic materials 3a and 5a on both surfaces of the electrolyte membrane in a state in which property of the electrolyte membrane 1 is excellently maintained by using process of the first protective film and the second protective film in the roll-to-roll process.

According to the present disclosure, unlike the decal method for transferring the catalyst electrode layer on the electrolyte membrane according to the related art, the catalytic materials 3 and 5 may be formed on both surfaces of the electrolyte membrane by using the direct coating method in the roll-to-roll process, and thus position deviation of the catalytic materials on both surfaces of the electrolyte membrane 1 may be minimized.

Thus, good quality of the MEA may be ensured, a process time for manufacturing the MEA may be shortened, and productivity of the MEA may be improved.

Further, a process and equipment for transferring the catalyst electrode layer on the electrolyte membrane according to the related art may be removed, and thus may reduce investment costs for facilities and operator maintenance costs. In addition, a low-cost protective film may be used instead of an expensive release film, thereby reducing material cost according to production of the MEA.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for manufacturing a membrane-electrode assembly (MEA) of a fuel cell, the device comprising:
an electrolyte membrane feeder unwinding an electrolyte membrane comprising a front surface, a rear surface, and a first protective film attached to said rear surface and being wound in a roll form, wherein said electrolyte membrane feeder supplies an unwound electrolyte membrane to a preset transfer path;
a first catalyst coater installed in a front side of said electrolyte membrane feeder and coating a first catalytic material on said front surface of the electrolyte membrane at a preset pitch to form a first catalyst electrode layer;
a film processor installed in a rear side of said first catalyst coater, supplying a second protective film onto said first catalyst electrode layer on said front surface of said electrolyte membrane, and taking off said first protective film from said rear surface of said electrolyte membrane; and
a second catalyst coater installed in a rear side of said film processor and coating a second catalytic material on said rear surface of said electrolyte membrane at a preset pitch to form a second catalyst electrode layer.

2. The device of claim 1, wherein the electrolyte membrane is transferred along the transfer path by a roll-to-roll method.

3. The device of claim 1, further comprising:
a first drying furnace installed in the middle of the transfer path between the first catalyst coater and the film processing unit, the first drying furnace drying the first catalyst electrode layer.

4. The device of claim 3, further comprising:
a second drying furnace installed in the middle of the transfer path in a rear side of the second catalyst coater, the second drying furnace drying the first catalyst electrode layer on the front surface of the electrolyte membrane and the second catalyst electrode layer on the rear surface of the electrolyte membrane.

5. The device of claim 4, further comprising:
an MEA rewinder installed in a rear side of the second drying furnace to rewind an MEA roll sheet with said second protective film attached to the first catalyst electrode layer on said front surface and said second catalyst electrode layer on said rear surface of said electrolyte membrane.

6. The device of claim 1, further comprising:
a position sensor installed in a front side of the second catalyst coater, sensing a position of the first catalyst electrode layer, and outputting a sensed signal to a controller.

7. The device of claim 6, wherein the controller determines a coating position of the second catalyst coater according to the sensed signal of the position sensor.

8. The device of claim 1, wherein the film processor comprises:
a film rewinder installed in one side of the transfer path and taking off the first protective film from the rear surface of the electrolyte membrane to wind the electrolyte membrane in a roll form; and
a film unwinder, which corresponds to the film rewinder, installed in another side of the transfer path and unwinding the second protective film to supply the second protective film onto the first catalyst electrode layer on the front surface of the electrolyte membrane.

9. The device of claim 8, wherein the film processor forms the film rewinder and the film unwinder in a single cartridge body.

10. The device of claim 1, wherein the film rewinder comprises:
a rewinding roller winding the first protective film in a roll form; and
a first guide roller guiding the first protective film, which is peeled from the rear surface of the electrolyte membrane, to the rewinding roller.

11. The device of claim 1, wherein the film unwinder comprises:
an unwinding roller unwinding the second protective film wound in a roll form; and a second guide roller guiding the second protective film onto the first catalyst electrode layer on the front surface of the electrolyte membrane.

12. The device of claim 1, wherein the first catalyst coater and the second catalyst coater comprise:
a slot die including a long slot nozzle that is formed along a width direction of the electrolyte membrane.

13. The device of claim 12, wherein a first support roller, which supports the rear surface of the electrolyte membrane, is installed in a side of the first catalyst coater, and
a second support roller, which supports the front surface of the electrolyte membrane, is installed in a side of the second catalyst coater.

14. A method for manufacturing a membrane-electrode assembly (MEA) of a fuel cell, the method comprising:
unwinding, by an electrolyte membrane feeder, an electrolyte membrane, which includes a front surface, a rear surface, and a first protective film attached to said rear surface and is wound in a roll form, and suppling an unwound electrolyte membrane to a preset transfer path;
coating, by a first catalyst coater, a first catalytic material on said front surface of said electrolyte membrane at a preset pitch to form a first catalyst electrode layer;
supplying, by a film processor, a second protective film onto said first catalyst electrode layer on said front surface of said electrolyte membrane and taking off the first protective film from said rear surface of said electrolyte membrane; and
coating, by a second catalyst coater, a second catalytic material on said rear surface of said electrolyte membrane at a preset pitch to form a second catalyst electrode layer.

15. The method of claim 14, wherein, in a process in which the electrolyte membrane is transferred along the transfer path by a roll-to-roll process, the first catalytic material is coated on the front surface of the electrolyte membrane by the first catalyst coater in a state in which the first protective film is attached to the rear surface of the electrolyte membrane, and
the second catalytic material is coated on the rear surface of the electrolyte membrane by the second catalyst coater in a state in which the second protective film is attached to the front surface of the electrolyte membrane.

16. The method of claim 14, wherein a first drying furnace passes the electrolyte membrane and dries the first catalyst electrode layer on the front surface of the electrolyte membrane.

17. The method of claim 14, wherein a position of the first catalyst electrode layer on the other surface of the electrolyte membrane is sensed by a position sensor, and
wherein a sensed signal is outputted to a controller.

18. The method of claim 17, wherein a coating position of the second catalyst coater is adjusted according to the sensed signal of the position sensor by the controller.

19. The method of claim 14, wherein a second drying furnace passes the electrolyte membrane and dries the first catalyst electrode layer on the front surface of the electrolyte membrane and a second catalyst electrode layer on the rear surface of the electrolyte membrane.

20. The method of claim 19, wherein the second drying furnace passes an MEA roll sheet in which the first catalyst electrode layer on the second protective film attached to the first catalyst electrode layer on said front surface and said second catalyst electrode layer on said rear surface of said electrolyte membrane, and
the MEA roll sheet is wound in a roll form by an MEA rewinder.

* * * * *